United States Patent
Cheong et al.

(10) Patent No.: US 9,264,728 B2
(45) Date of Patent: Feb. 16, 2016

(54) INTRA-PLANE AND INTER-PLANE PREDICTIVE METHOD FOR BAYER IMAGE CODING

(71) Applicant: SONY CORPORATION, Tokyo (JP)

(72) Inventors: Hye-Yeon Cheong, Milpitas, CA (US); Yoichi Yagasaki, Tokyo (JP); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 14/270,007

(22) Filed: May 5, 2014

(65) Prior Publication Data

US 2015/0201200 A1    Jul. 16, 2015

Related U.S. Application Data

(60) Provisional application No. 61/925,948, filed on Jan. 10, 2014.

(51) Int. Cl.
*G06K 9/36* (2006.01)
*H04N 19/186* (2014.01)
*H04N 19/124* (2014.01)
*H04N 19/59* (2014.01)
*H04N 19/154* (2014.01)

(52) U.S. Cl.
CPC ........... *H04N 19/186* (2014.11); *H04N 19/124* (2014.11); *H04N 19/154* (2014.11); *H04N 19/59* (2014.11)

(58) Field of Classification Search
USPC ........................................................ 382/166
See application file for complete search history.

(56) References Cited

U.S. PATENT DOCUMENTS

2011/0255780 A1   10/2011   Hsieh

FOREIGN PATENT DOCUMENTS

EP         1605705 A1    12/2005
WO      2005116927 A1    12/2005

*Primary Examiner* — Duy M Dang
(74) *Attorney, Agent, or Firm* — John P. O'Banion (57) ABSTRACT

An apparatus and method for enhanced encoding and decoding of Bayer images is presented. The use of intra-plane prediction, which relies on correlation between neighboring pixels of the same color, is enhanced by adding inter-plane prediction that relies on correlation between neighboring pixels in different color planes (i.e., different colors). The inter-plane prediction is performed within either a single residual computation, or across multiple residual computations, such as generating an intra-predicted set of residuals which are then utilized in computing inter-predicted residuals.

20 Claims, 3 Drawing Sheets

INTRA-PLANE AND INTER-PLANE PREDICTIVE METHOD FOR BAYER IMAGE CODING

CROSS-REFERENCE TO RELATED APPLICATIONS

This application claims the benefit of U.S. provisional patent application Ser. No. 61/925,948 filed on Jan. 10, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Field of the Technology

This disclosure pertains generally to digital imaging, and more particularly to Bayer color encoding and decoding of digital images.

2. Background Discussion

Numerous color camera systems (e.g., digital cameras, camcorders, and scanners) utilizing single-chip digital image sensors make use of a Bayer filter mosaic including a color filter array (CFA) for arranging RGB color filters on/over a grid of photosensors. This particular (Bayer) arrangement of color filters, having 50% green, 25% red and 25% blue, is utilized to create a color image, and is alternately referred to as RGBG, GRGB, or RGGB. It should be appreciated that since the human eye is more sensitive to green there are more green pixels because more content in the green portion of the spectrum enhances image appearance.

Bayer color images are typically encoded with only 8-bit resolution, as opposed to the typical 24-bit (RGB) representation. By assigning each pixel either a Red, Blue, or one of two Green values (i.e., Gr, Gb), one can then utilize the color information in the vicinity of each pixel to specify the actual color for that pixel, or assign colors for that pixel group. Bayer encoding utilizes a color mosaic in which the colors alternate so that the colors in a neighborhood can be used to determine the value for each color component of the pixel in question.

Figure 1:
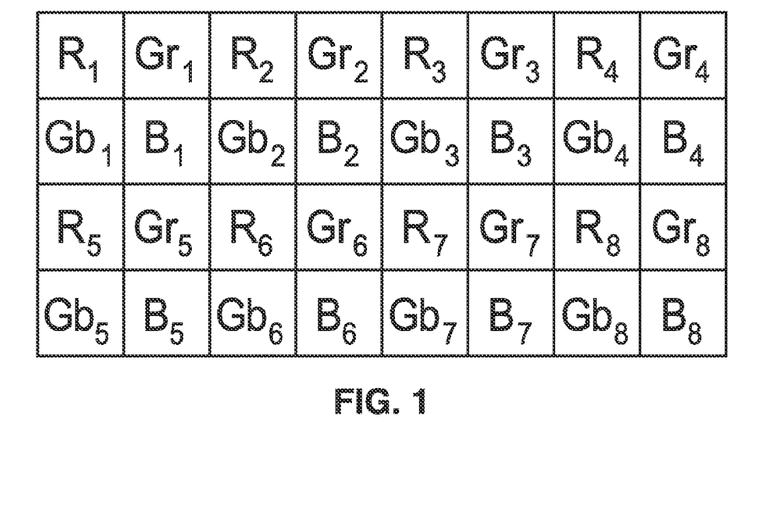
FIG. 1 is an example of Bayer color pixel arrangements showing eight pixel groups.

FIG. 1 depicts a Bayer color mosaic, showing a total of 8 pixel groups, $R_1$, $B_1$, $Gr_1$, $Gb_1$, through to $R_8$, $B_8$, $Gr_8$, $Gb_8$. It can be seen that every position has a particular color component and is surrounded by at least two of each of the other color values. It will be noted that a Bayer image has four color planes (1) R-plane, (2) Gr-plane, (3) Gb-plane, and (4) B-plane. References to image "planes" in Bayer encoding refer to a "color-plane".

Typically, residuals are generated for these pixels based on a difference between the pixel and an average of neighboring pixels of the same color. Generally, the averaging process in Bayer encoding exploits spatial correlation within the same color, and is referred to as intra-plane correlation. This averaging takes into account that closely neighboring samples with the same color tend to have more similar values compared to distant samples. For example, it is more likely that $|R_1-R_2|<|R_1-R_4|$.

However, it would be beneficial to enhance prediction during Bayer color encoding to increase encoding efficiency.

Accordingly, the present technology extends Bayer encoding benefits and overcomes shortcomings of previous approaches.

BRIEF SUMMARY OF THE TECHNOLOGY

Bayer image encoding and decoding is enhanced in the present technology by performing inter-plane correlations to enhance the performance of intra-plane correlations, and thus to increase coding efficiency.

This technology performs a combination of intra-plane prediction and inter-plane prediction, upon which residuals are generated which are entropy coded into an output bitstream. These different forms of prediction can be performed in a single level of residual computations, or across multiple levels of residual computation.

In a single level of residual computation, the intra-plane prediction computation is modified by incorporating inter-plane computation in one or more of the color residuals being computed. In this manner, only a single level of computation is performed. The intra-plane and inter-plane prediction can be alternatively spread across multiple residual computations. For example, a first set of residuals can be generated based on intra-plane prediction, and followed up by computing a second set of residuals based on the first set of residuals computed by taking inter-plane correlations into account within the prediction. Inter-plane prediction can be incorporated for any of the colors, with the embodiments describing applying inter-plane prediction to both types of green pixels to augment intra-plane prediction.

A Bayer image decoder is similarly realized according to this technology, in which a bitstream for a Bayer encoded image is received and decoded using the same prediction mechanisms described for the encoder.

The above combining of inter-plane prediction with intra-plane prediction can be performed within Bayer encoding and decoding systems having a number of different configurations. For example, embodiments are described for utilizing encoders that perform quantization either before or after prediction is performed.

It should be appreciated that the present technology has been configured so that it may be utilized in combination with any desired intra-plane prediction scheme without departing from the teachings of the present technology.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosure will be more fully understood by reference to the following drawings which are for illustrative purposes only.

DETAILED DESCRIPTION

The present technology is motivated by a realization that inter-plane correlation exists within Bayer images as well as intra-plane correlation. That is to say, that not only correlations of adjacent pixels of the same color (intra-plane) have significance, but also correlations exist with other colors (inter-plane) within the Bayer image. Additional inter-plane correlations are performed according to the present technology to enhance Bayer image encoding toward compressing the color image data more efficiently.

Figure 2:
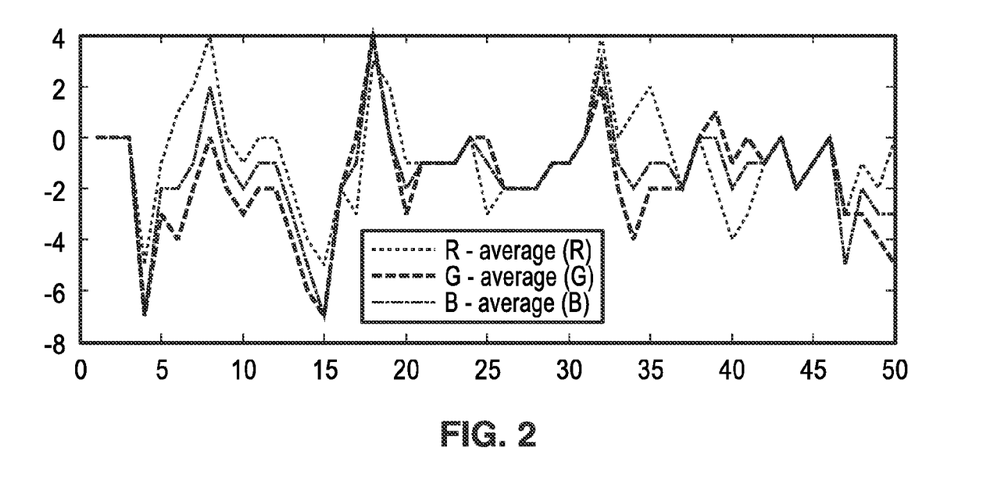
FIG. 2 is a plot of inter-plane correlations (across colors) indicating a basis for augmenting intra-plane prediction with inter-plane prediction.

FIG. 2 depicts a plot of inter-plane correlations. Fluctuations about the zero value are shown in response to computing R—average(R), G—average(G), and B—average(B) within a given block. The x-axis of the plot depicts spatial pixel position in a single row. The figure shows that even though R, G, B have typically very different values, their spatial change (or variation or fluctuation) is correlated across different colors. Toward clearly depicting this situation in the single plot of FIG. 2, the color mean was subtracted from each color across the range of pixels.

It will be seen that these inter-plane correlations (across different colors), exist because spatial value changes and/or fluctuations tend to be similar for each of the colors R, Gr, Gb, and B. For example, if $R_1<R_2$, it is also likely this general color relation is similar for the other colors, for example $B_1<B_2$, $Gr_1<Gr_2$, and $Gb_1<Gb_2$. The plot indicates the basis upon which the present technology for augmenting intra-plane prediction with inter-plane prediction has merit.

By way of example and not limitation, in the following descriptions, the inventive method is implemented for 8×1 random access coding, an example of an 8×1 block is $R_1$, $Gr_1$, $R_2$, $Gr_2$, $R_3$, $Gr_3$, $R_4$, $Gr_4$ from FIG. 1.

Figure 3:
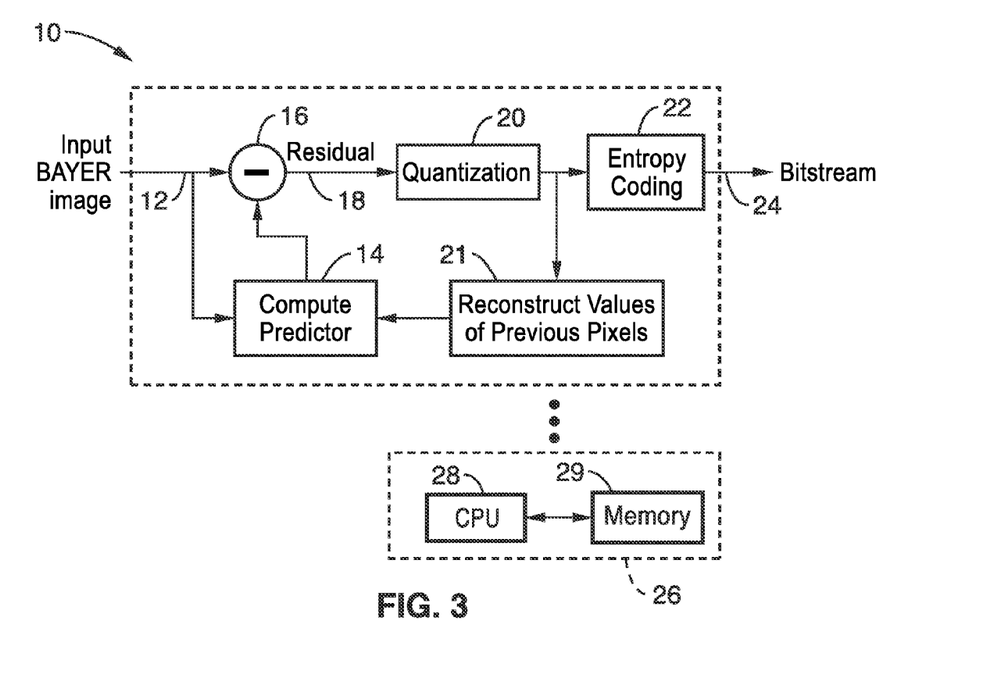
FIG. 3 is a schematic flow diagram of a first Bayer encoder embodiment utilized according the present technology.
Figure 4:
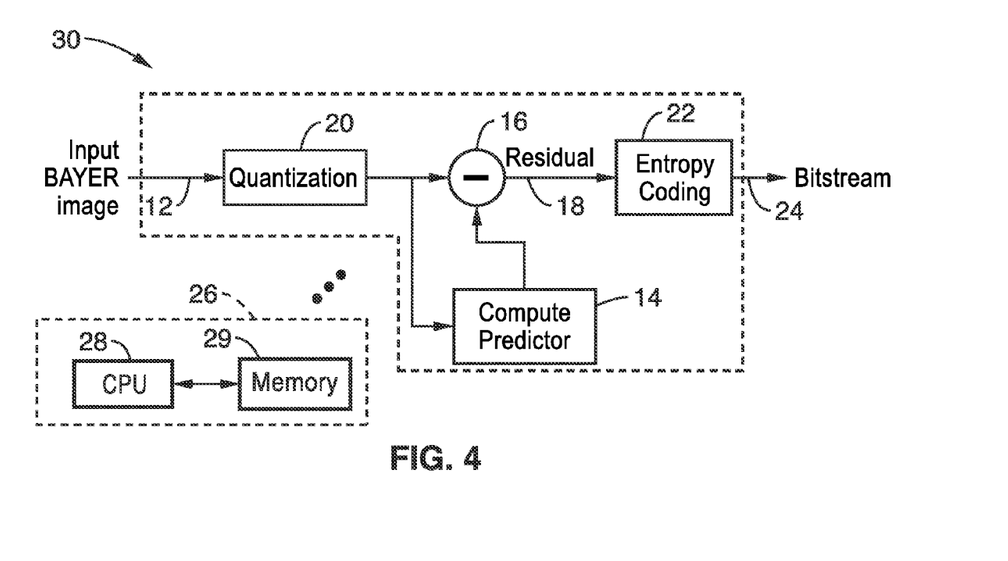
FIG. 4 is a schematic flow diagram of a second Bayer encoder embodiment utilized according the present technology.

FIG. 3 and FIG. 4 illustrate example embodiments 10, 30 of Bayer encoders which can be utilized according to methods for exploiting inter-plane correlations during encoding, such as by entropy coding utilizing differential pulse code modulation (DPCM), or a combination of pulse code modulation (PCM) and DPCM. It should be appreciated that embodiments 10, 30 are provided by way of example and not limitation, as the present technology can be practiced on other encoder configurations without departing from the teachings of the present technology.

In FIG. 3, a Bayer image is input 12, to which a predictor is determined 14, utilizing reconstructed values 21 from previous pixels, and a difference determined at sum junction 16 to produce residual 18 (i.e., a positive or negative value) which is quantized 20 and then entropy coded 22 to produce bitstream output 24. It will be noted that in the process of quantization 20, some information is lost, whereby the predictor 14 must be determined based on the reconstructed value after quantization.

The encoding process is seen being performed by a processing means 26 including at least one computer processor 28, such as a central processor unit (CPU or GPU), microprocessor, microcontroller, DSP, programmable array devices, or similar devices configured for programmed or programmable execution in performing blocks 14 through 22. Processing means 26 is also shown with at least one memory 29, such as for storing data and programming for processor 28. The memory may include solid state memory and other computer-readable media. The present technology is non-limiting with regard to memory and computer-readable media, insofar as these are non-transitory, and thus not constituting a transitory electronic signal.

In FIG. 4, a Bayer image is input 12 and quantized 20, after which a predictor is determined 14, and a difference output at sum junction 16 to produce a residual 18 which is entropy coded 22 to produce bitstream output 24. Embodiment 30 preferably utilizes the same processing means 26 including at least one computer processor 28 and at least one memory 29, as described in regard to FIG. 3.

The following section describes two different mechanisms (methods) for performing prediction according to the present technology. It should be noted that either of these may be utilized in the step of computing predictor 14 exemplified in FIG. 3 and FIG. 4, or with other coding arrangements that generate a residual based on computing a difference with a predictor.

In a first prediction method, inter-plane prediction is performed at the same time as the intra-plane prediction. It will be recognized that intra-plane prediction is performed and residuals generated according to the following:

$$\Delta R_n = R_n - SP(R_n),$$

$$\Delta Gr_n = Gr_n - SP(Gr_n),$$

$$\Delta Gb_n = Gb_n - SP(Gb_n), \text{ and}$$

$$\Delta B_n = B_n - SP(B_n),$$

In the above equations, "SP" represents performing a spatial prediction based on pixels in the same color plane, that is to say, prediction is performed in response to pixels of the same color which are in the vicinity (e.g., direct neighbors, or to a lesser extent, indirect neighbors). However, according to this method, these predictions are modified by inter-plane prediction incorporated into one or more of these color predictions, whereby the prediction is performed based on a combination of the same plane and different planes.

An example of this first method of prediction is described below in which a combination of intra-prediction and inter-prediction is performed on the green colors, while red and blue are only subject to intra-prediction. Residuals for colors $R_n$, $Gr_n$, $Gb_n$, $B_n$, are determined as $\Delta R_n$, $\Delta Gr_n$, $\Delta Gb_n$, $\Delta B_n$, from predictions determined as follows:

$$\Delta R_n = R_n - SP(R_n)$$

$$\Delta Gr_n = Gr_n - SP(Gr_n) + R_n - SP(R_n)$$

$$\Delta Gb_n = Gb_n - SP(Gb_n) + B_n - SP(B_n)$$

$$\Delta B_n = B_n - SP(B_n)$$

It should be appreciated that many variations of the above generalized method can be implemented without departing from the present technology. For example, inter-plane prediction can be performed for other colors (red and blue instead of the green, or another combination of the colors), or the red and blue inter-predictive components can be swapped in relation to Gr and Gb in some instances, or additional inter-prediction added, such as being based on more distant pixels, just to name a few examples applicable to the present technology.

In the above description, $SP(X_n)$ means "spatial predictor" of color X in pixel group n. The spatial predictor refers to the use of any desired intra-plane prediction process for a given color pixel in the given pixel group. It is seen above that the red pixel and the blue pixel are predicted only in response to their spatial prediction of the same color, while green pixel prediction includes an inter-plane prediction component which includes a red and blue residual. It should be noted that R and B are preferably differentiated from Gr and Gb, because the green colors typically have a higher fluctuation than red and blue colors, whereby incorporation of inter-plane prediction results in greater stability and accuracy of the green colors to provide the most benefit.

In the second prediction method, inter-plane prediction is performed at a different residual computation level than the intra-plane prediction. By way of example, inter-plane prediction is performed within a second level of residual computation following computing residuals for intra-plane prediction. According to this method, at least one computation level is performed which includes inter-plane prediction, across the color planes, for one or more of the colors R, Gr, Gb, or B.

In a first step, for each color, an intra-color spatial prediction residual is determined in at least one level of computation:

$$\Delta R_n = R_n - SP(R_n)$$

$$\Delta Gr_n = Gr_n - SP(Gr_n)$$

$$\Delta Gb_n = Gb_n - SP(Gb_n)$$

$$\Delta B_n = B_n - SP(B_n)$$

In the above equations, $SP(X_n)$ again means "spatial predictor" of color X in pixel group n. Example of these spatial predictors (1D or 2D blocks) include: $SP(X_6)=X_5$, $SP(X_6)=X_2$, $SP(X_6)=X_5+X_2-X_1$, and so forth. It will be appreciated that $X_n$ needs to be predicted from a neighboring pixel $X_m$, that may be found in any desired direction (e.g., above, left, right, and below) when considering a 2D block, or left or right in a 1D block. However, prediction is preferably performed in relation to neighboring pixels that have already been coded. So for example, in a 1D block (e.g., 8×1), there may be only one preferred choice of a left-side neighbor (e.g., $X_{n-1}$), which has already been coded and can be utilized.

In a second step, spatial prediction residuals are again predicted from neighboring spatial prediction residuals for at least a portion of the colors, exemplified as follows:

$$\Delta\Delta Gr_n = \Delta Gr_n - \Delta R_n$$

$$\Delta\Delta Gb_n = \Delta Gb_n - \Delta B_{n-1}$$

These residuals are then entropy encoded along with $\Delta R_n$ and $\Delta B_n$ from the first level of residual computation, to produce the encoded bitstream.

An alternate implementation of the second step computes residuals for all colors, exemplified as follows:

$$\Delta\Delta R_n = \Delta R_n - \Delta Gr_{n-1}$$

$$\Delta\Delta Gr_n = \Delta Gr_n - \Delta R_n$$

$$\Delta\Delta Gb_n = \Delta Gb_n - \Delta B_{n-1}$$

$$\Delta\Delta B_n = \Delta B_n - \Delta Gb_n$$

It should be noted that the $1^{st}$ and $3^{rd}$ lines above have an index n−1, instead of an index of n, toward utilizing information about pixels which have already been coded. In certain applications or configurations, pixels from other directions can be alternatively or additionally utilized as well when computing this next level of residuals.

The decision on the direction of available pixels to utilize is easiest to understand when considering the decoder side. It will be seen that the decoder can first compute $\Delta R_n$, but doesn't have information $\Delta Gr_n$ yet, so the decoder can't use $\Delta Gr_n$ to compute $\Delta\Delta R_n$. Thus, in computing $\Delta\Delta R_n$, the decoder relies on $\Delta R_n$ and $\Delta Gr_{n-1}$. However, when the decoder decodes $Gr_n$, it can compute $\Delta Gr_n$ and also $\Delta R_n$. So when computing $\Delta\Delta Gr_n$, the decoder uses $\Delta Gr_n$ and $\Delta R_n$.

Finally, the above residuals ($\Delta\Delta R_n$, $\Delta\Delta Gr_n$, $\Delta\Delta Gb_n$, $\Delta\Delta B_n$) are entropy coded into an entropy encoded Bayer bitstream. It should be appreciated that except for the first few samples, for which previous spatial prediction residual values are unavailable (which are PCM coded), the rest of samples are preferably DPCM coded using both intra-color and inter-color neighboring samples.

It will be noted that in the 1D implementation, inter-color predictor is the left neighboring sample's spatial prediction residual. However, the present technology is not limited in that regard, as predictor position can be selected according to different implementations and applications.

It should be appreciated that the method can be utilized for both "non-random access" and "random access" conditions. In "random access" conditions, when encoding a given block, the encoder and decoder do not need access to other blocks. This means that the decoder can still decode any given block without having to know information of the other blocks. In contrast to this, under "non-random access" conditions, the ability is needed to access other blocks, such as neighboring blocks, as the predictor is computed based on pixels of the other blocks. This means that the decoder can only decode a given block in random access conditions if the decoder can access other blocks.

Test results from both the single and multiple level residual computation methods indicate a significant improvement in peak signal-to-noise ratio (PSNR) (e.g., greater than 1 dB), when including inter-plane prediction. In testing these embodiments, the left sample of the same color is used as a predictor for spatial prediction. In addition, during testing, the 1D 8×1 block was utilized. It should be appreciated that higher gains can be expected for larger blocks and for 2D blocks.

It should be appreciated that the above inter-plane prediction elements of the present technology should not be confused with the wholly different process of color weighting. Color weighting is performed for correcting colors using fixed offsets, based on parametric measurements of a given model of color imager (e.g., charge-coupled device (CCD)), toward remediating fixed levels of color offsets and bleeding.

Figure 5:
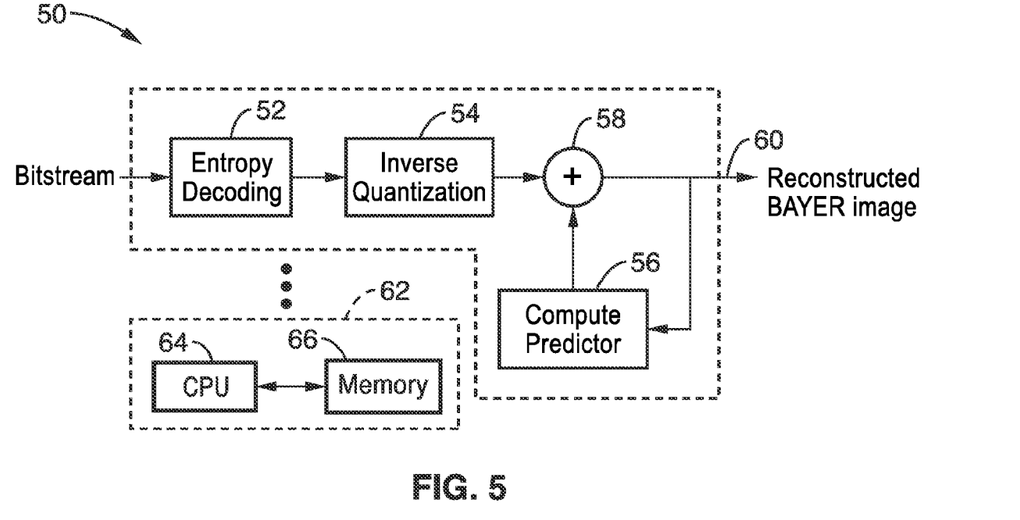
FIG. 5 is a schematic flow diagram of a first Bayer decoder embodiment utilized according the present technology.
Figure 6:
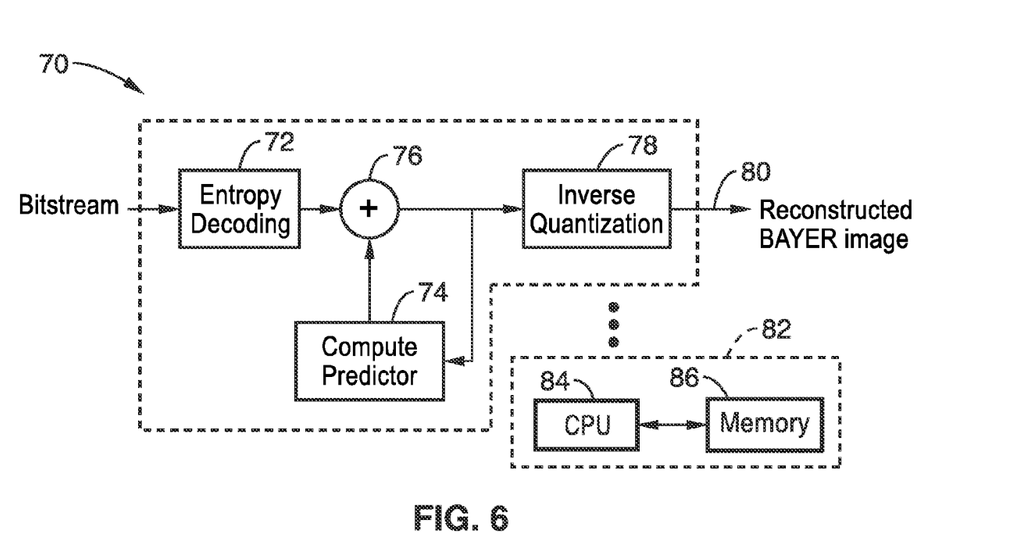
FIG. 6 is a schematic flow diagram of a second Bayer decoder embodiment utilized according the present technology.

FIG. 5 and FIG. 6 illustrate example embodiments 50, 70 of Bayer decoders, which are counterparts of the encoders shown in FIG. 3 and FIG. 4, respectively, for exploiting inter-plane correlations during decoding, such as by decoding a bitstream which was entropy coded utilizing differential pulse code modulation (DPCM), or a combination of pulse code modulation (PCM) and DPCM. It should be appreciated that embodiments 50, 70 are provided by way of example and not limitation, as the present technology can be practiced on other decoder configurations without departing from the teachings of the present technology.

In FIG. 5, an encoded bitstream is received for entropy decoding 52 followed by inverse quantization 54, with a sum determined 58 at a sum junction in response to a computed predictor 56. The summed output 60 being a reconstruction of the original Bayer input image. It will be appreciated that prediction can be performed on this decoder in the same manner as described for the encoders of FIG. 3 and FIG. 4.

The decoding process is seen being performed by a processing means 62 including at least one computer processor 64, such as a central processor unit (CPU or GPU), microprocessor, microcontroller, DSP, programmable array devices, or similar devices configured for programmed or programmable execution in performing blocks 52 through 58. Processing means 62 is also shown with at least one memory 66, such as for storing data and programming for processor 64. The memory may include solid state memory and other computer-readable media. The present technology is non-limiting with regard to memory and computer-readable media, insofar as these are non-transitory, and thus not constituting a transitory electronic signal.

In FIG. 6, an encoded bitstream is received for entropy decoding 72 followed summing 76 at a sum junction in response to a computed predictor 74, after which inverse quantization 78 is performed to generate a reconstruction of the original Bayer input image 80. It will be appreciated that prediction can be performed on this decoder in the same manner as described for the encoders of FIG. 3 and FIG. 4. Embodiment 70 preferably utilizes a similar processing means 82 including at least one computer processor 84 and at least one memory 86, as described in regard to the decoder of FIG. 5.

The present technology can be incorporated within encoder and decoder, such as for integration with various devices configured for Bayer color image capture (e.g., digital cameras, camcorders, and scanners), or in response to receiving color image information from an image capture device.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the present technology can be embodied in various ways, including but not limited to the following:

1. An apparatus for Bayer encoding, comprising: (a) a computer processor configured for receiving color pixel data of an input Bayer image containing red (Rn), blue (Bn), two greens (Grn) and (Gbn) pixels associated with each pixel group number n; and (b) programming in a non-transitory computer readable medium and executable on the computer processor for performing steps comprising: (i) performing intra-plane prediction, in which prediction of a given color is based on neighboring pixels of a same color; (ii) performing inter-plane prediction, in which prediction of a given color is based on neighboring pixels of different colors, to enhance said intra-plane prediction; (iii) generating at least one set of residuals based on a combination of said intra-plane prediction and said inter-plane prediction; and (iv) entropy coding quantized versions of said at least one set of residuals to generate an entropy coded Bayer bitstream.

2. The apparatus of any of the previous embodiments, wherein said programming executable from a non-transitory computer readable medium, is further configured for performing said inter-plane prediction across different colors and in different pixel groups.

3. The apparatus of any of the previous embodiments, wherein said programming executable from a non-transitory computer readable medium is configured to perform said inter-plane prediction on the input Bayer image by incorporating spatial prediction of one or more of the green pixels, Grn or Gbn, based on inter-plane prediction in response to adding a red or blue residual.

4. The apparatus of any of the previous embodiments, wherein said programming executable from a non-transitory computer readable medium is configured to perform said inter-plane prediction on the input Bayer image by incorporating spatial prediction of Grn based on inter-plane prediction, by adding the difference between Rn and the spatial prediction of Rn.

5. The apparatus of any of the previous embodiments, wherein said programming executable from a non-transitory computer readable medium is configured to perform said inter-plane prediction on the input Bayer image by incorporating spatial prediction of Gbn based on inter-plane prediction, by adding the difference between Bn and the spatial prediction of Bn.

6. The apparatus of any of the previous embodiments, wherein said programming executable from a non-transitory computer readable medium is configured for performing quantization on said input Bayer image either prior to, or after prediction.

7. The apparatus of any of the previous embodiments, wherein said programming executable from a non-transitory computer readable medium is configured for generating said at least one set of residuals, as a single set of residuals, which are computed as a combination of both intra-plane prediction and inter-plane prediction.

8. The apparatus of any of the previous embodiments, wherein said programming executable from a non-transitory computer readable medium is configured for generating said at least one set of residuals as at least two sets of residuals, in which intra-plane prediction and inter-plane prediction are computed across said at least two sets of residuals.

9. The apparatus of any of the previous embodiments, wherein said programming executable from a non-transitory computer readable medium is configured for performing intra-plane prediction when computing a first set of residuals, while inter-plane prediction is performed when computing a second set of residuals.

10. The apparatus of any of the previous embodiments, wherein said programming executable from a non-transitory computer readable medium is configured for generating said at least two sets of residuals in which at least one of the sets of residuals is determined by utilizing the residuals from a previously computed set of residuals.

11. The apparatus of any of the previous embodiments, wherein said programming executable from a non-transitory computer readable medium, is configured for computing said at least two sets of residuals by steps comprising: (a) generating said first set of residuals from intra-plane spatial prediction for each color in each color group as $\Delta Rn$, $\Delta Grn$, $\Delta Gbn$, and $\Delta Bn$; (b) modifying said first set of residuals into said second set of residuals as follows:

$$\Delta\Delta Rn = \Delta Rn - \Delta Grn - 1; \Delta\Delta Grn = \Delta Grn - \Delta Rn;$$

$$\Delta\Delta Gbn = \Delta Gbn - \Delta Bn - 1; \text{ and } \Delta\Delta Bn = \Delta Bn - \Delta Gbn.$$

12. The apparatus of any of the previous embodiments, wherein said color pixel data is received in either one dimensional (1D), or two-dimensional (2D) blocks.

13. The apparatus of any of the previous embodiments, wherein said apparatus for Bayer encoding is an image capture device, or receives image information from an image capture device.

14. The apparatus of any of the previous embodiments, wherein said image capture device is selected from the group of image capture devices consisting of digital cameras, camcorders, and scanners.

15. An apparatus for Bayer encoding, comprising: (a) a computer processor configured for receiving color pixel data, as one or two dimensional image blocks, of an input Bayer image containing red (Rn), blue (Bn), two greens (Gm) and (Gbn) pixels associated with each pixel group number n; and (b) programming in a non-transitory computer readable medium and executable on the computer processor for performing steps comprising: (i) performing intra-plane prediction, in which prediction of a given color is based on neighboring pixels of the same color, from which a first set of residuals are determined; (ii) performing inter-plane prediction, in which prediction of a given color is based on neighboring pixels of different colors to enhance intra-plane prediction, in determining a second set of residuals; and (iii) entropy coding quantized versions of said second set of residuals to generate an entropy coded Bayer bitstream.

16. The apparatus of any of the previous embodiments, wherein said programming executable from a non-transitory computer readable medium, is further configured for performing said inter-plane prediction across different colors and in different pixel groups.

17. The apparatus of any of the previous embodiments, wherein said programming executable from a non-transitory computer readable medium is configured to perform said inter-plane prediction on the input Bayer image by augmenting the spatial prediction of one or more of the green pixels, Grn or Gbn, based on inter-plane prediction in response to adding a red or blue residual.

18. The apparatus of any of the previous embodiments, wherein said programming executable from a non-transitory computer readable medium is configured for performing quantization on said input Bayer image either prior to, or after prediction.

19. An apparatus for decoding a Bayer encoded image, comprising: (a) a computer processor configured for receiving a bitstream of a Bayer encoded image containing red (Rn), blue (Bn), two greens (Gm) and (Gbn) pixels associated with each pixel group number n; and (b) programming in a non-transitory computer readable medium and executable on the computer processor for performing steps comprising: (i) performing entropy decoding of the received bitstream of a Bayer encoded image; (ii) performing intra-plane prediction, in which prediction of a given color is based on neighboring pixels of a same color; (iii) performing inter-plane prediction, in which prediction of a given color is based on neighboring pixels of different colors, to enhance said intra-plane prediction; (iv) performing inverse quantization on entropy decoded output, either before or after performing said intra-plane and said inter-plane predictions; and (v) generating a reconstructed Bayer image based on a combination of said intra-plane prediction and said inter-plane prediction, after summing with the decoded signal, upon which inverse quantization is performed before or after prediction and summing.

20. The apparatus of any of the previous embodiments, wherein inter-plane prediction is performed across different colors and in different pixel groups.

Although the description above contains many details, these should not be construed as limiting the scope of the technology but as merely providing illustrations of some of the presently preferred embodiments of this technology. Therefore, it will be appreciated that the scope of the present technology fully encompasses other embodiments which may become obvious to those skilled in the art, and that the scope of the present technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present technology, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for Bayer encoding, comprising:
   (a) a computer processor configured for receiving color pixel data of an input Bayer image containing red ($R_n$), blue ($B_n$), two greens ($Gr_n$) and ($Gb_n$) pixels associated with each pixel group number n; and
   (b) programming in a non-transitory computer readable medium and executable on the computer processor for performing steps comprising:
       (i) performing intra-plane prediction, in which prediction of a given color is based on neighboring pixels of a same color;
       (ii) performing inter-plane prediction, in which prediction of a given color is based on neighboring pixels of different colors, to enhance said intra-plane prediction;
       (iii) generating at least one set of residuals based on a combination of said intra-plane prediction and said inter-plane prediction; and
       (iv) entropy coding quantized versions of said at least one set of residuals to generate an entropy coded Bayer bitstream.

2. The apparatus recited in claim 1, wherein said programming executable from a non-transitory computer readable medium, is further configured for performing said inter-plane prediction across different colors and in different pixel groups.

3. The apparatus recited in claim 1, wherein said programming executable from a non-transitory computer readable medium is configured to perform said inter-plane prediction on the input Bayer image by incorporating spatial prediction of one or more of the green pixels, $Gr_n$ or $Gb_n$, based on inter-plane prediction in response to adding a red or blue residual.

4. The apparatus recited in claim 1, wherein said programming executable from a non-transitory computer readable medium is configured to perform said inter-plane prediction on the input Bayer image by incorporating spatial prediction of $Gr_n$ based on inter-plane prediction, by adding the difference between $R_n$ and the spatial prediction of $R_n$.

5. The apparatus recited in claim 1, wherein said programming executable from a non-transitory computer readable medium is configured to perform said inter-plane prediction on the input Bayer image by incorporating spatial prediction of $Gb_n$ based on inter-plane prediction, by adding the difference between $B_n$ and the spatial prediction of $B_n$.

6. The apparatus recited in claim 1, wherein said programming executable from a non-transitory computer readable medium is configured for performing quantization on said input Bayer image either prior to, or after prediction.

7. The apparatus recited in claim 1, wherein said programming executable from a non-transitory computer readable medium is configured for generating said at least one set of residuals, as a single set of residuals, which are computed as a combination of both intra-plane prediction and inter-plane prediction.

8. The apparatus recited in claim 1, wherein said programming executable from a non-transitory computer readable medium is configured for generating said at least one set of residuals as at least two sets of residuals, in which intra-plane prediction and inter-plane prediction are computed across said at least two sets of residuals.

9. The apparatus recited in claim 8, wherein said programming executable from a non-transitory computer readable medium is configured for performing intra-plane prediction when computing a first set of residuals, while inter-plane prediction is performed when computing a second set of residuals.

10. The apparatus recited in claim 8, wherein said programming executable from a non-transitory computer readable medium is configured for generating said at least two sets of residuals in which at least one of the sets of residuals is determined by utilizing the residuals from a previously computed set of residuals.

11. The apparatus recited in claim 8, wherein said programming executable from a non-transitory computer readable medium, is configured for computing said at least two sets of residuals by steps comprising:
    (a) generating said first set of residuals from intra-plane spatial prediction for each color in each color group as $\Delta R_n$, $\Delta Gr_n$, $\Delta Gb_n$, and $\Delta B_n$; and
    (b) modifying said first set of residuals into said second set of residuals as follows:

$$\Delta\Delta R_n = \Delta R_n - \Delta Gr_{n-1};$$

$$\Delta\Delta Gr_n = \Delta Gr_n - \Delta R_n;$$

$$\Delta\Delta Gb_n = \Delta Gb_n - \Delta B_{n-1}; \text{ and}$$

$$\Delta\Delta B_n = \Delta B_n - \Delta Gb_n.$$

12. The apparatus recited in claim 1, wherein said color pixel data is received in either one dimensional (1D), or two-dimensional (2D) blocks.

13. The apparatus recited in claim 1, wherein said apparatus for Bayer encoding is an image capture device, or receives image information from an image capture device.

14. The apparatus recited in claim 1, wherein said image capture device is selected from the group of image capture devices consisting of digital cameras, camcorders, and scanners.

15. An apparatus for Bayer encoding, comprising:
    (a) a computer processor configured for receiving color pixel data, as one or two dimensional image blocks, of an input Bayer image containing red ($R_n$), blue ($B_n$), two greens ($Gr_n$) and ($Gb_n$) pixels associated with each pixel group number n; and
    (b) programming in a non-transitory computer readable medium and executable on the computer processor for performing steps comprising:
        (i) performing intra-plane prediction, in which prediction of a given color is based on neighboring pixels of the same color, from which a first set of residuals are determined;
        (ii) performing inter-plane prediction, in which prediction of a given color is based on neighboring pixels of different colors to enhance intra-plane prediction, in determining a second set of residuals; and
        (iii) entropy coding quantized versions of said second set of residuals to generate an entropy coded Bayer bitstream.

16. The apparatus recited in claim 15, wherein said programming executable from a non-transitory computer readable medium, is further configured for performing said inter-plane prediction across different colors and in different pixel groups.

17. The apparatus recited in claim 15, wherein said programming executable from a non-transitory computer readable medium is configured to perform said inter-plane prediction on the input Bayer image by augmenting the spatial prediction of one or more of the green pixels, $Gr_n$ or $Gb_n$, based on inter-plane prediction in response to adding a red or blue residual.

18. The apparatus recited in claim 15, wherein said programming executable from a non-transitory computer readable medium is configured for performing quantization on said input Bayer image either prior to, or after prediction.

19. An apparatus for decoding a Bayer encoded image, comprising:
   (a) a computer processor configured for receiving a bitstream of a Bayer encoded image containing red ($R_n$), blue ($B_n$), two greens ($Gr_n$) and ($Gb_n$) pixels associated with each pixel group number n; and
   (b) programming in a non-transitory computer readable medium and executable on the computer processor for performing steps comprising:
      (i) performing entropy decoding of the received bitstream of a Bayer encoded image;
      (ii) performing intra-plane prediction, in which prediction of a given color is based on neighboring pixels of a same color;
      (iii) performing inter-plane prediction, in which prediction of a given color is based on neighboring pixels of different colors, to enhance said intra-plane prediction;
      (iv) performing inverse quantization on entropy decoded output, either before or after performing said intra-plane and said inter-plane predictions; and
      (v) generating a reconstructed Bayer image based on a combination of said intra-plane prediction and said inter-plane prediction, after summing with the decoded signal, upon which inverse quantization is performed before or after prediction and summing.

20. The apparatus recited in claim 19, wherein inter-plane prediction is performed across different colors and in different pixel groups.

* * * * *